July 5, 1932.  H. C. BOSTWICK  1,866,391

HINGED FORMING DRUM

Filed May 6, 1931  2 Sheets-Sheet 1

Inventor,
H. C. Bostwick,
By Robert M. Pierson,
Attorney

July 5, 1932.   H. C. BOSTWICK   1,866,391
HINGED FORMING DRUM
Filed May 6, 1931   2 Sheets-Sheet 2

Inventor,
H. C. Bostwick,
By Robert M Pierson,
Attorney

Patented July 5, 1932

1,866,391

UNITED STATES PATENT OFFICE

HENRY C. BOSTWICK, OF AKRON, OHIO, ASSIGNOR TO THE AKRON STANDARD MOLD CO., OF AKRON, OHIO, A CORPORATION OF OHIO

HINGED FORMING DRUM

Application filed May 6, 1931. Serial No. 535,456.

This invention relates to collapsible forms, cores or mandrels having a periphery composed in whole or in part of pivoted segments, such forms including those used in the manufacture of pneumatic tire casings.

My object is to provide, by means of a suitable arrangement of spaced pivotal centers and crossed hinge members, for contracting the form, in the region of the heel portions of the segments, to a smaller diameter than is possible in other arrangements, in order to facilitate the removal of the formed article, particularly when the latter is a tire band of relatively small diameter, having inextensible beads or edges.

Of the accompanying drawings, Fig. 1 is a rear elevation and section on the line 1—1 of Fig. 3, showing a preferred embodiment of my invention as applied to one type of former or drum, the latter being in its expanded condition.

Figure 1:
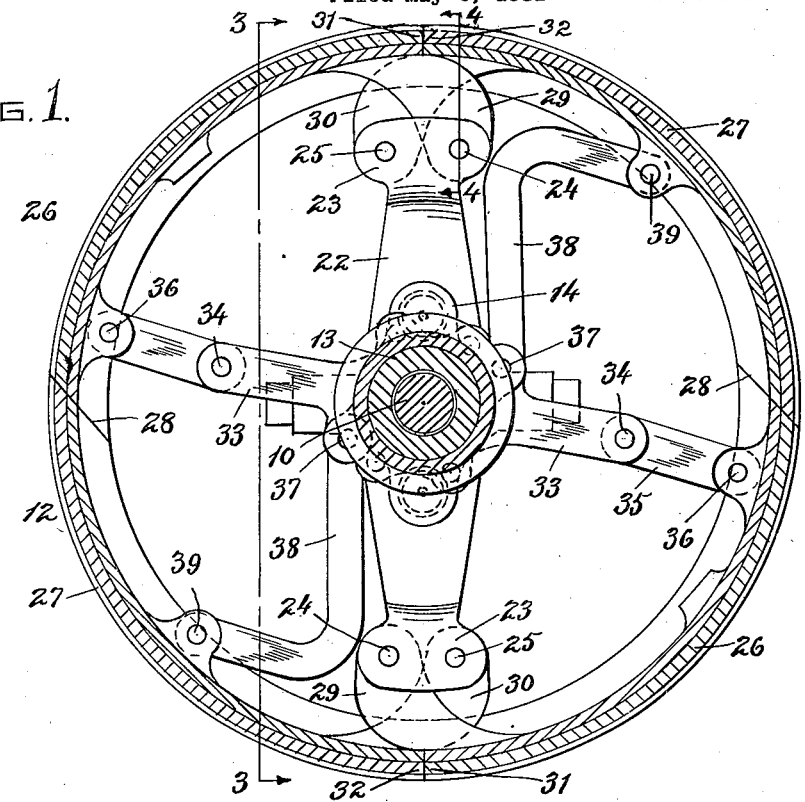

The mandrel or former here shown is intended for the building of semi-flat tire bands and is of a type disclosed in my co-pending application Serial No. 436,716, filed March 18, 1930, although the present invention could be applied to other types of collapsible forms.

In the drawings, 10 (Figs. 1 and 2) is a horizontal rotary shaft projecting from the casing 11 (Fig. 3) of a tire-building machine and carrying at its forward end the drum 12 whose peripheral portion is made up of pivoted segments each of which may be longitudinally divided to make the drum adjustable in length axially thereof for accommodating different widths of tire bands.

The shaft 10 is surrounded by a hollow shaft 13 made in sections of which the forward one telescopes in non-turning relation upon the rear section to correspond with drums of different axial length. The forward section of said hollow shaft carries a collar 14 which is capable of turning with said hollow shaft upon the inner shaft 10 for the purpose of collapsing the drum by the power of the latter's own rotation when the hollow shaft is retarded by means of a brake band 15 applied to a brake drum 16 on the hollow shaft. One end of band 15 is fixed at 17 and the other end attached to a short arm 18 on a rock-shaft 19 having an oppositely-projecting arm 20 which may be operated by any suitable power such as the fluid-pressure ram or piston and cylinder device 21 pivoted at its lower end on the casing 11.

22 is a segment support in the form of a spider having a hub secured to the end of the shaft 10 and a pair of oppositely-projecting arms with forks 23 at their ends constituting the inner hinge members for pivotally supporting the segments.

Each spider fork 23 carries a pair of adjacent hinge or pivot pins 24, 25 parallel with the central shaft axis and located at equal radial distances therefrom. To the respective pins on each fork are pivoted a form segment 26 and an oppositely-swinging form segment 27 whose free end overlaps that of the complemental segment 26 attached to the opposite spider arm, each pair of ends meeting in a diagonal joint 28 when the drum is expanded. Each segment 26 has a single ear 29 constituting a hinge member projecting inwardly from the vicinity of its heel portion in a general diagonal direction to the corresponding hinge pin 24, and each segment 27 has a pair of ears 30 straddling the ear 29 and constituting a hinge member extending in a general diagonal direction to the corresponding hinge pin 25, so that the two hinge members cross each other. 31 indicates the heel portion of the segment 26 and 32 indicates that of the segment 27, these two heel portions on opposite sides of the drum substantially meeting each other in radial joints when said drum is expanded.

The collar 14 is formed with oppositely-projecting arms 33 whose outer extremities are pivoted at 34 to the inner ends of short toggle links 35 and the outer ends of said toggle links are pivoted at 36 to ears formed on the inner sides of the segments 26. Said arms 33 are further pivoted near their bases at 37 to a pair of longer angular toggle links 38 whose outer ends are pivoted at 39 to ears formed on the inner sides of the segments 27. In the expanded condition of the drum as shown in Fig. 1, the pivots 37 of the toggles formed by the collar 14 and the longer links 38 have passed slightly over center, and the pivots 34 of the toggles formed by said collar and the shorter links 35 have stopped just short of center or straightened condition so that the free ends of the segments 27 will have moved slightly inward to meet the ends of the segments 26 at the joints 28 after completion of the outward movement of said segments 27. It will be obvious that this drum is expansible by centrifugal force from its collapsed condition when the shaft 10 is started in rotation.

Figure 2:
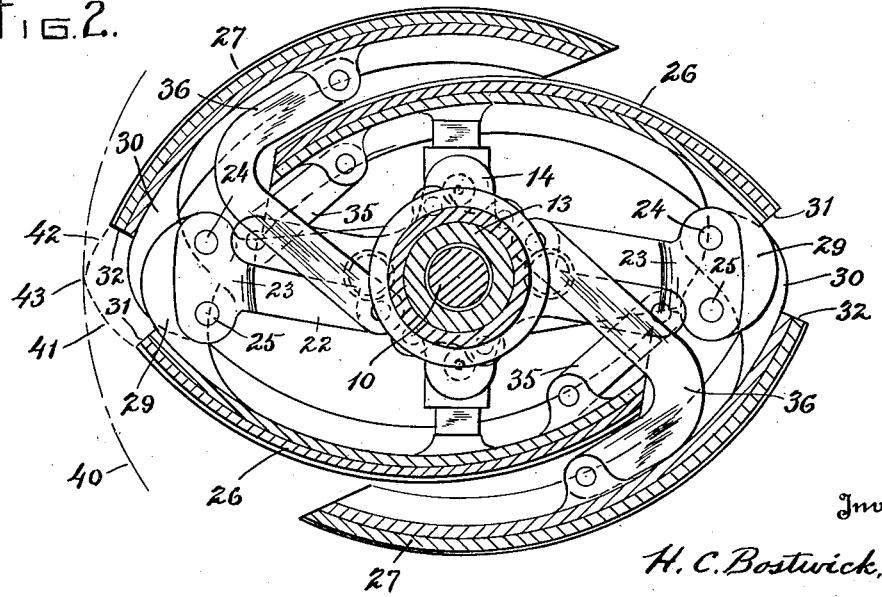
Fig. 2 is a similar view showing the drum collapsed.
Figure 3:
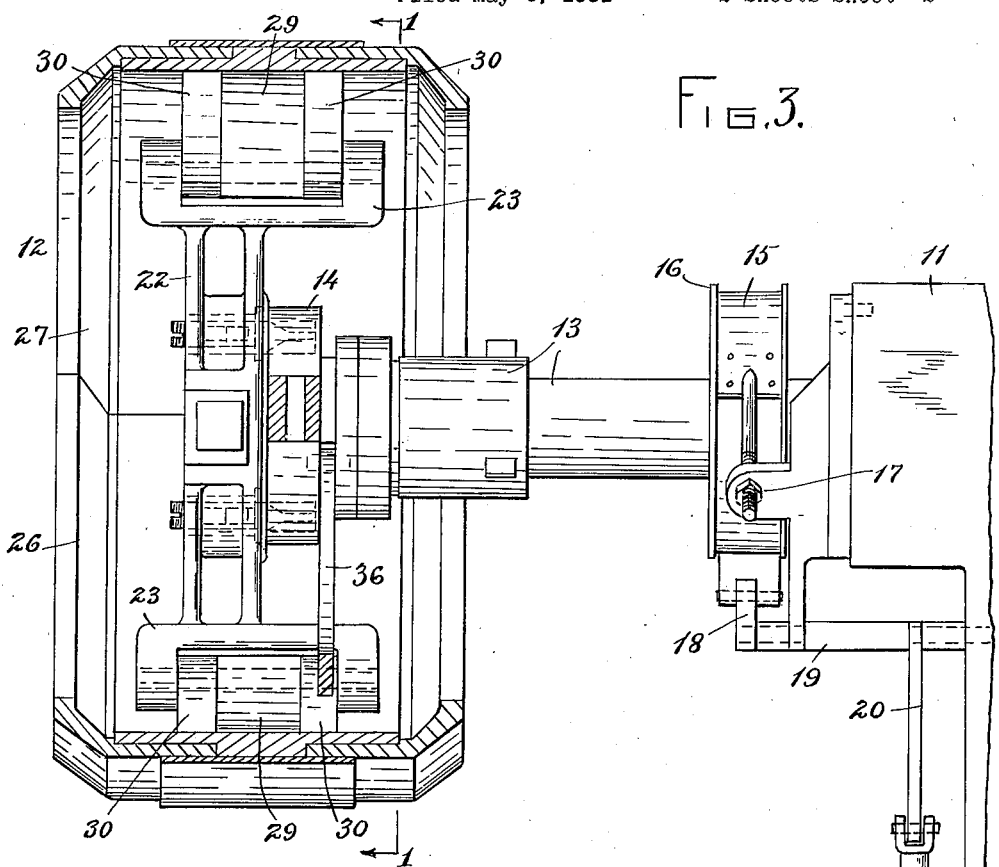
Fig. 3 is a side elevation and longitudinal section on the line 3—3 of Fig. 1, including associated parts.
Figure 4:
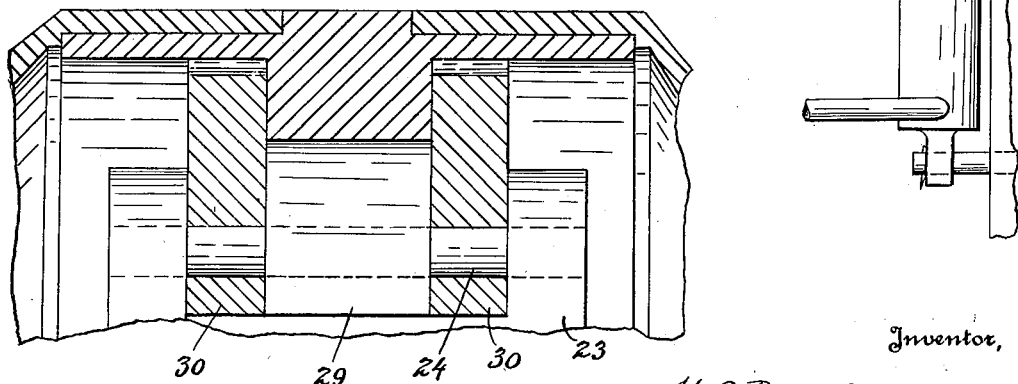
Fig. 4 is a detail section on a larger scale, on the line 4—4 of Fig. 1.

In Fig. 2, the broken line 40 represents an arc of the outer circle or circumference of the drum in its fully expanded condition and 41, 42 represent the arcs of travel of the outer corners of the segment heel portions 31 and 32 respectively, the latter arcs meeting the drum circle 40 in non-tangent relation at an angle 43. Hence it will be seen that the crossed hinges of the drum segments cause the paths of the segment heels to depart within the drum circle 40 at a substantial slope from the latter when the drum is collapsed and the greatest collapsed diameter of the drum, measured between these heel portions, is substantially less than is obtainable by former arrangements. Also, no portions of the paths of the heel portions lie outside of the drum circle to cause resistance to the collapsing of the drum by having to slightly expand the portions of the tire band in contact with said heel portions. This feature considerably facilitates the collapsing of the drum and removal of the finished band, particularly when the latter is a tire band of relatively small diameter having inextensible bead edges.

I claim:

1. A collapsible form comprising a supporting structure, and adjacent form segments pivoted to said structure on different centers and having crossed hinge portions.

2. A collapsible form comprising an inner support, a pair of oppositely-swinging outer form segments pivoted to said support on adjacent parallel axes, said segments having crossed hinge portions and heel portions whose arcs of movement meet at an angle.

3. A collapsible circular form comprising rotary supporting means, and a peripheral portion composed entirely of four segments arranged in two pairs of oppositely-swinging members pivoted to said supporting means on adjacent parallel axes and having crossed hinge portions, the heel portions of said segments swinging on arcs in non-tangent relation to the outer circle of the form, lying entirely within said circle.

In witness whereof I have hereunto set my hand this 2nd day of May, 1931.

HENRY C. BOSTWICK.